United States Patent
Woodward et al.

(10) Patent No.: US 6,169,706 B1
(45) Date of Patent: Jan. 2, 2001

(54) ECHO DETECTION IN PULSE-ECHO RANGING SYSTEMS

(75) Inventors: Steven J. Woodward, Port Hope; Thomas Mike Bednarchuk, Havelock, both of (CA)

(73) Assignee: Milltronics Ltd., Peterborough (CA)

( * ) Notice: Under 35 U.S.C. 154(b), the term of this patent shall be extended for 0 days.

(21) Appl. No.: 09/323,688

(22) Filed: Jun. 2, 1999

(30) Foreign Application Priority Data

Jun. 2, 1998 (GB) .................................................. 9811866

(51) Int. Cl.[7] ............................. G01S 15/08; G01S 13/08; G01F 23/00
(52) U.S. Cl. ........................... 367/99; 367/908; 342/124; 73/290 V
(58) Field of Search ............................. 342/124; 367/908, 367/99; 73/290 V

(56) References Cited

U.S. PATENT DOCUMENTS

| | | | |
|---|---|---|---|
| 4,315,325 | * | 2/1982 | Blades .................................. 342/124 |
| 4,837,578 | * | 6/1989 | Gammell .............................. 367/99 |
| 4,890,266 | * | 12/1989 | Woodward ........................... 367/99 |
| 4,992,998 | * | 2/1991 | Woodward ........................... 367/99 |
| 5,323,361 | * | 6/1994 | Elle et al. ............................. 367/99 |

* cited by examiner

Primary Examiner—Ian J. Lobo
(74) Attorney, Agent, or Firm—Ridout & Maybee

(57) ABSTRACT

A method for processing an echo amplitude profile generated by an echo ranging system with reference to a temporal axis to identify return echoes comprised by the profile by identifying amplitude peaks in the profile above with respect to an amplitude axis, a threshold curve on the same temporal axis, wherein the threshold curve is generated by identifying rising edges of echoes in the profile, and generating curve segments extending on the temporal axis from points at or above said leading edges to intersections with descending edges of echoes in the profile, whereby to trace echo base lines delimiting access of the echoes. The invention also extends to a method for processing an echo amplitude profile. According to a further feature of the invention, there is provided a method for processing an echo amplitude profile generated by an echo ranging system with reference to a temporal axis to identify return echoes comprised by the profile by identifying amplitude peaks in the profile above with respect to an amplitude axis, threshold curve on the same temporal axis, whereby to define echo base lines delimiting areas of the echoes, comprising identifying the position of at least a selected echo on the temporal axis by determining the temporal position of the center of area of at least the selected one of the areas so delimited.

8 Claims, 3 Drawing Sheets

ECHO DETECTION IN PULSE-ECHO RANGING SYSTEMS

FIELD OF THE INVENTION

This invention relates to echo ranging systems, and more particularly to the processing of return echo signals generated by such systems in order to identify wanted echo and determine its temporal location.

BACKGROUND OF THE INVENTION

Such systems typically depend on projecting towards a surface whose range is to be determined a short pulse of radiation having a wavelength which is very short compared to the range to be determined, and receiving a return signal including an echo reflected from the surface. The radiation may be acoustic radiation, typically in the range 10 to 50 kHz for general industrial applications, or electromagnetic (EM) radiation, typically microwave radiation in the range 5 to 10 GHz. Both exemplified forms of radiation have wavelengths of the same general order of magnitude, the wavelength in air of 10 kHz acoustic radiation and 10 GHz electromagnetic radiation being similar. Both are typically effectively reflected at an interface between material of substantially different densities although there are differences which may favour one or the other in particular applications. EM radiation is much less affected by the composition and temperature of an atmosphere in which it propagates, but its high speed of propagation has required different techniques to capture and display an echo profile. We have found, as described in U.S. Pat. No. 4,596,144 of which one of the present inventors was co-inventor and the content of which is hereby incorporated by reference, that successful echo processing in industrial applications is greatly facilitated by capturing and digitizing amplitude profiles of return signals over an extended period to generate a digital database the content of which may be processed to facilitate echo recognition. U.S. Pat. No. 4,890,266 issued Dec. 26, 1989, of which one of the present inventors was inventor, and the content of which is incorporated herein by reference, discloses further processing techniques applied to assist in recognizing a true or wanted echo. Both these patents describe the use of acoustic radiation.

In International Patent Application PCT/CA98/00117, which designates the United States, and the content of which is incorporated herein by reference, a microwave transducer head is described which, although using electromagnetic radiation, provides an output signal which is very similar in character to that return signal form of a typical acoustic transducer, and can be processed using similar techniques to those used for process return signals from acoustic transducers.

It is a particular characteristic of such a microwave transducer head that it produces a return signal that has, for a comparable range coverage, sufficiently similar characteristics and a duration of sufficiently comparable order of magnitude to that provided by an acoustic transducer that we have found that similar echo processing techniques can be used to those developed for processing acoustic return signals.

It is an object of the present invention to provide further improvements in echo processing techniques applicable to echo profile databases derived from either acoustic or microwave pulse-echo ranging systems, with a view to addressing two problems encountered in such systems.

A first problem is that, once a true or wanted echo has been identified, selection of the exact position to be assigned to that echo on the time axis for the purpose of range calculations still presents problems since echo shapes and characteristics can vary widely, and such variations will affect the results obtained using conventional techniques such as assuming a fixed relationship to the beginning or sill of the echo, or to the peak of the echo. The sill location will vary accordingly to the shape of the echo, and the peak may be difficult to determine for flat-topped or noisy echoes.

A second problem arises because transducers, whether acoustic or microwave, produce echo profiles in which echo signals are superimposed on a time varying background signal mainly caused by ringing of the transducer, whose characteristics vary from transducer to transducer, and with time, temperature and environment. It is usual practice to compare the echo profile with a time varying threshold (TVT) signal representing this background signal, but although numerous techniques for generating TVT signals are known, none are believed wholly satisfactory under all circumstances.

SUMMARY OF THE INVENTION

According to the invention, there is provided a method for processing an echo amplitude profile generated by an echo ranging system with reference to a temporal axis to identify return echoes comprised by the profile by identifying amplitude peaks in the profile above with respect to an amplitude axis, a threshold curve on the same temporal axis, wherein the threshold curve is generated by identifying rising edges of echoes in the profile, and generating curve segments extending on the temporal axis from points at or above said leading edges to intersections with descending edges of echoes in the profile, whereby to trace echo base lines delimiting access of the echoes.

According to a further feature of the invention, there is provided a method for processing an echo amplitude profile generated by an echo ranging system with reference to a temporal axis to identify return echoes comprised by the profile by identifying amplitude peaks in the profile above with respect to an amplitude axis, threshold curve on the same temporal axis, whereby to define echo base lines delimiting areas of the echoes, comprising identifying the position of at least a selected echo on the temporal axis by determining the temporal position of the centre of area of at least the selected one of the areas so delimited.

SHORT DESCRIPTION OF THE DRAWINGS

DESCRIPTION OF THE PREFERRED EMBODIMENT

Figure 1:
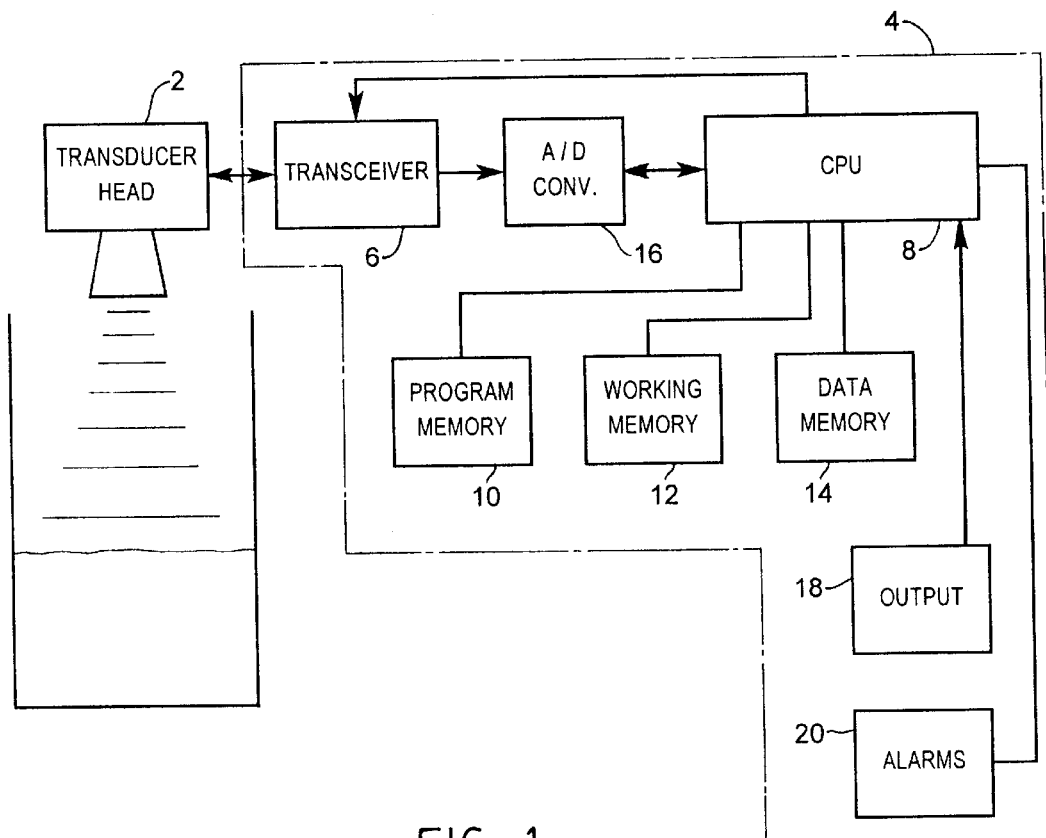
FIG. 1 is a simplified diagram of a pulse-echo ranging system in accordance with the invention.

Referring to the drawings, the system comprises a transducer head 2, and a processing unit 4, including a transceiver 6, a microprocessor 8, program memory 10, working memory 12, data memory 14, an analog-to-digital converter 16, data output 18, and limit alarms 20.

If the transducer unit is a microwave transducer unit as described in Application PCT/CA98/00117, then the transceiver 6 need only implement a receiving function since the transmit pulses are generated in the transducer head. In either case, the receiving function will logarithmically amplify and detect the amplitude of a signal received at a frequency determined by the characteristics of the transducer head, either an actual transducer resonant frequency, or an aliased frequency characteristic of the output of the transducer head. This signal will then be sampled by the analog-digital converter to provide a digital database of return echo samples which represent the variation of amplitude of the return echo profile relative to an amplitude axis with respect to a temporal axis. This profile can be processed to identify a wanted echo, as described for example in the prior patents already referenced above.

U.S. Pat. Nos. 4,596,144 and 4,831,565 and 4,890,255 and 4,992,998 and 5,079,751 describe methods of digitizing the received signal, storing it in computer memory and then enhancing processing the stored echo profile to locate the true echo from the target. These patents disclose the use of a time varying threshold (TVT) for comparing echoes. The TVT allows distant echoes, which are low amplitude, to be compared with nearer echoes that are high amplitude. The construction of the TVT curve is complex. No single TVT construction method has been found to be suitable for all applications. Therefore the user is required to select an appropriate TVT curve and even to make further adjustments to the selected curve in some applications. We have developed a method of comparing echoes without the use of a conventional TVT.

The echo profile is acquired by an acoustic or microwave transducer head and enhanced as described in patents above. Then, instead of constructing a TVT curve, a line is drawn across the bottom of each echo in the echo profile, using a comprised version of the following routine stored in the program memory, which is a C language function named echo_base_lines ( ).

```
void echo_base_lines(struct echo_template *echosp)
/*-----------------------------------------------------------------
Description                     Draw echo base lines.
Parameters
Return                          fills echosp->tvt[] with
                                echo base lines
Resources                       none
Dependiences                    none
Warnings                        Be very carefull about
                                changing > to >= or
                                i+1 to i etc. may cause array
                                overflow or incorrect
                                operation. Suggestion:
                                graphically test on
                                many profiles.
Usage                           May be used instead cf a TVT
                                curve.
Example
Keywords
Created by:                     Steven Woodward 12-Feb-98
Revised by:
-------------------------------------------------------------------*/
/*++>>ml*/                      /* end of library header */
{
return;
#if 0
uint size, i, j, width, blank, maxWidth,
byte *tvt, *echo;
byte level;
int point;
/* STEP: Get the input parameters */
 tvt = echosp->tvt;             /* pointer to start of tvt[] */
 echo = echosp->echo;           /* pointer to start of echo[] */
 size = echosp->long_echo_size; /* size of echo [] or tvt[] */
 blank = echosp->near_blanking; /* number of blank samples in
                                   echo[] */
 point = echosp->point;         /* transducer number */
```

-continued

```
/* MAX WIDTH is in units of mS, ccnvert to stadard samples */
 maxWidth = (uint) (recall_float(point,0,MAX_WIDTH) *0.001/
   standard_sample(point));
/* Initialize the array tvt[] to a constant high value DAC_MAX*/
 fill_file(tvt, size, DAC_MAX);
/* Draw the echo base lines in array tvt[] */
 for(i=blank+1; i<size; i++){      /* loop to check at each
                                      sample */
   level = echo[i];                /* level of this sample */
   width = 1;
   for(j=i+1; j<size; j++ ) {      /* move forward horizontally
                                      to end of file */
     width++;                      /* measuring the width as we
                                      go     */
     if (echo[j] <= level)         /* stop at falling edge
                                      intersect */
       break;
     if (width == maxWidth)        /* stop if too wide */
       break;
   }
   if (width>2 && width<maxWidth) { /* if we didn't overshoot, */
     fill_file(tvt+i, width, level); /* draw a line */
     i = j-1;                      /* and advance index to end
                                      of line */
   }
 }
 return;
#endif
} /* end of function */
```

Figure 2:
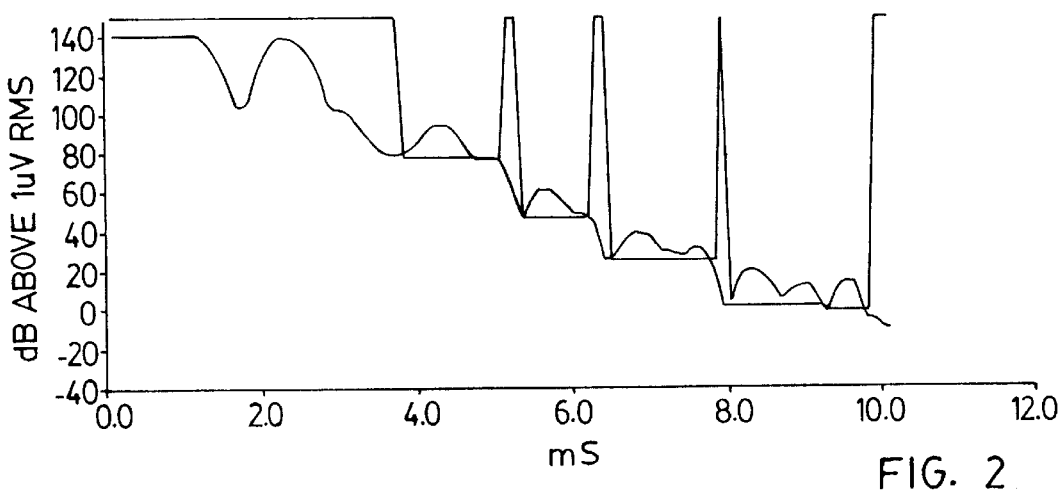
FIG. 2 is an echo profile illustrating the processing applied thereto in accordance with the present invention.
Figure 3:
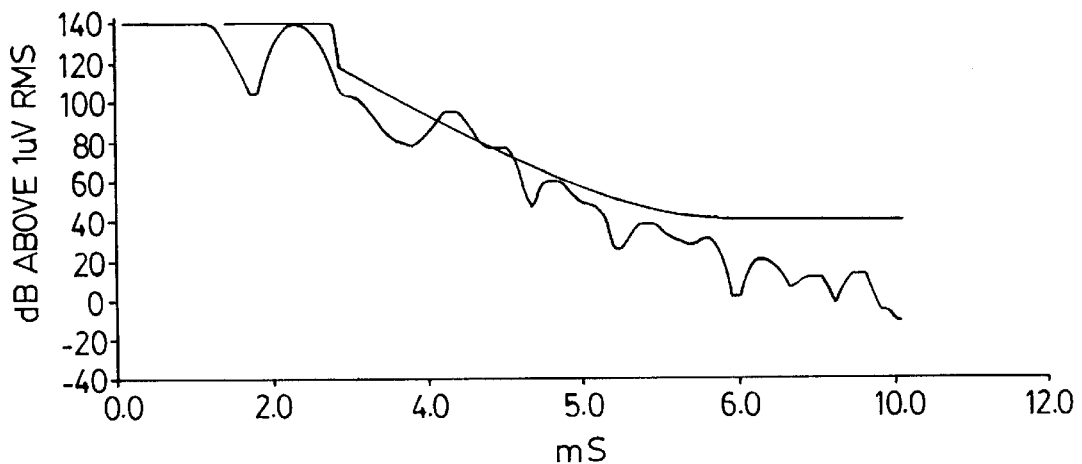
FIGS. 3–6 are samples showing time varying threshold curves produced by various prior art techniques.
Figure 4:
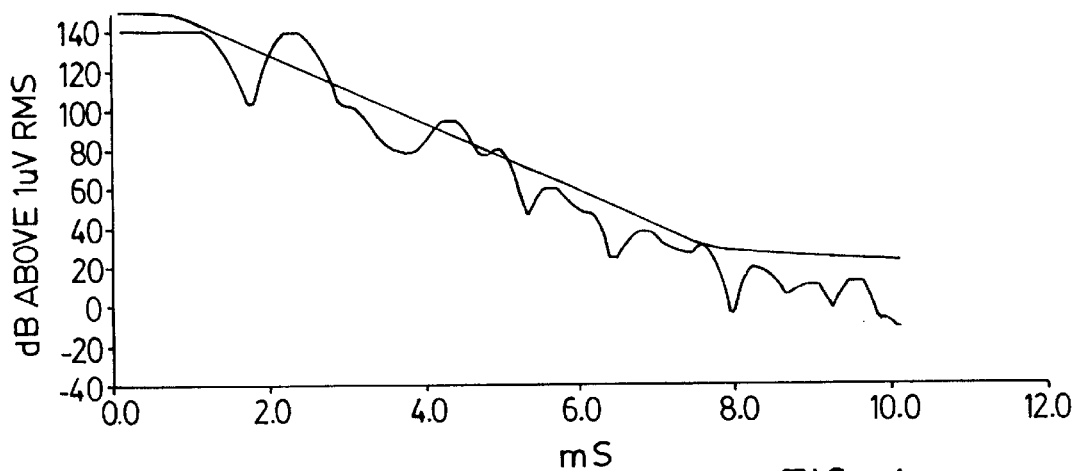
Figure 5:
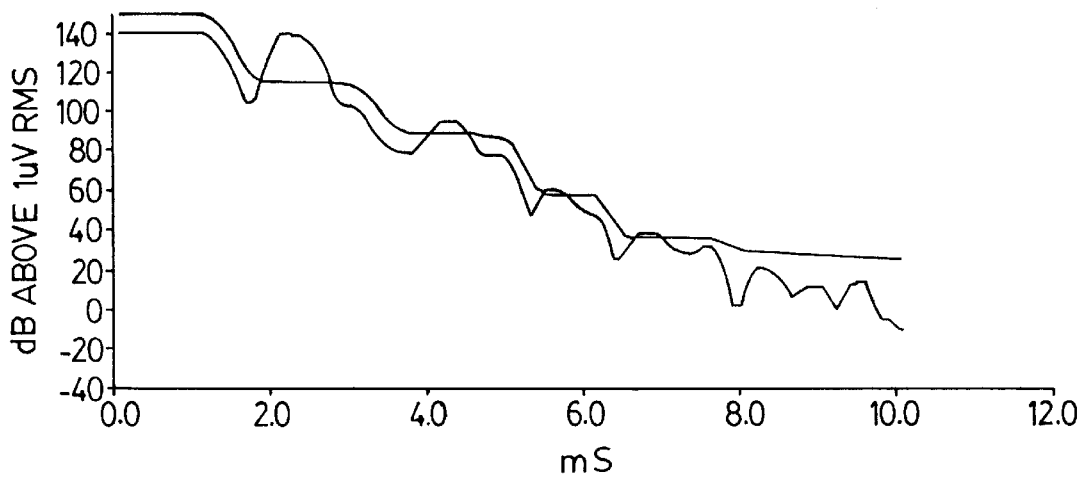
Figure 6:
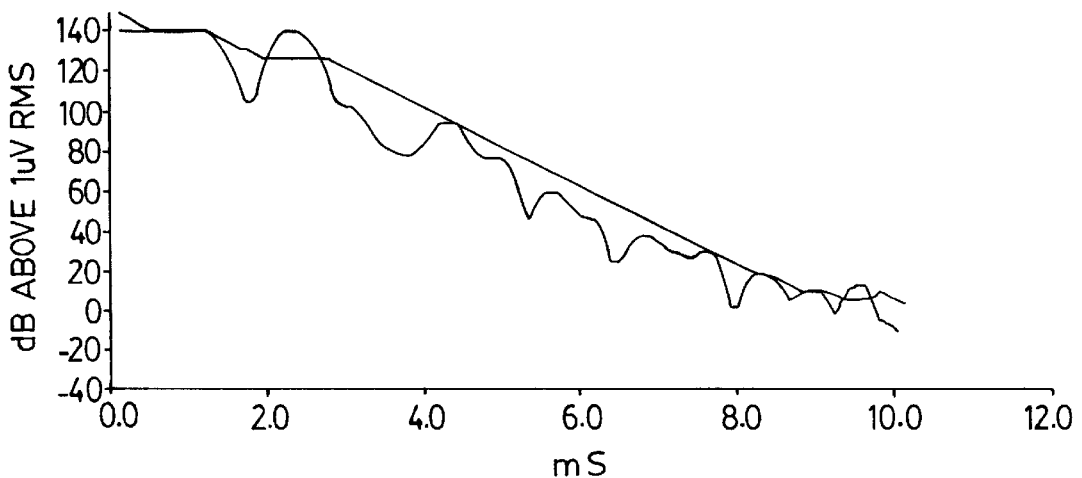

An actual echo profile obtained using the system described in Application PCT/CA96/00117, with base lines drawn by echo_base_lines ( ) as shown in FIG. 2. The same echo profile with TVT curves developed by various known methods is shown in FIG. 3 through FIG. 6 for comparison.

The base lines shown in FIG. 2 for each echo make it easy to measure echo properties such as area, amplitude and position. These are the same properties used to measure echoes relative to a TVT curve as described in above referenced patents. In fact, for easy implementation into existing echo processing software, the array containing the echo base lines can be used as if it were a TVT curve and is hence named tvt[ ] in the exemplary routine listed above, and is stored in a memory area normally reserved for storing a generated TVT curve. The routine for drawing the echo base lines is much simpler than the software for constructing a TVT curve. It executes faster, and has shown advantages compared with traditional TVT curves, particularly with near targets using microwave transducer heads.

Once echoes have been identified and delineated, whether by the above technique or some other technique, and an echo has been selected as the wanted or true echo, the problem remains of determining the echo position, bearing in mind that echoes will be spread and their profiles will vary according to range, environment and the profile of the transmitted pulse or pulses giving rise to the echo. Various techniques have been developed with a view to providing a consistent determination of echo position, none of which provides consistently good results under all circumstances. In particular, methods based on determining the peak of an echo may be problematic, since the positions of such a peak may be influenced by the presence of noise or difficult to determine if the peak is flattened. Some of these problems can be overcome by filtering or averaging the results of multiple shots, but this reduces the speed of response.

We have now found that the temporal position of the centre of mass of the echo area delineated by the echo profile and its base line (assuming the area of the echo to be formed of material of uniform mass per unit area) provides good stability in the selection of echo position without the need for excessive damping.

In order to perform this method, samples are generated of an echo, having a base line delimited by a TVT or by the method already described above, the delimitation being performed simply by differencing an array of echo profile samples (array echo), and an array of TVT or echo base line values (array tvt). The obtained samples represent increments of mass of each sample within the echo. A routine is then executed to evaluate the following expression for samples within the echo, where $x_i$ is the position of the sample within the array and $m_i$ is the mass of the sample for values of i within the temporal extent of the echo.

$$\text{Centre of Mass} := \frac{\sum_{i=start}^{end} x_i \cdot m_i}{\sum_{i=start}^{end} m_i}$$

In some cases it is advantageous to move the echo base line upwardly relative to the echo so that only an upper portion of the echo is evaluated. This proportion could be as little as the uppermost 10% of the area of the echo. This can be performed simply by evaluating the height of the echo above the echo base line, evaluated as described above or by reference to a TVT derived by some other technique, and drawing a further base line at an appropriate elevation. It is found that the position of the centre of mass on the temporal axis reliably provides an evaluation of echo position corresponding closely to that assessed by an experienced operator by visual assessment of a displayed echo profile. It is believed that this is because the mental process of such visual assessment may resemble the evaluation provided by the invention as described above.

Although the invention has been described with reference to pulse-echo ranging systems, it is applicable to other echo ranging systems capable of generating a return echo profile, for example microwave continuous wave frequency modulated (CWFM) systems.

We claim:

1. A method for processing an echo amplitude profile, generated by an echo ranging system with reference to a temporal axis, to identify return echoes comprised by the profile by identifying amplitude peaks in the profile, with respect to an amplitude axis, above a threshold curve on the same temporal axis, including the step of generating the threshold curve by identifying rising edges of echoes in the profile, and generating curve segments extending on the temporal axis from points at or above said rising edges to intersections with descending edges of echoes in the profile, the curve segments tracing echo base lines delimiting areas of the echoes beneath the echo amplitude profile.

2. A method according to claim 1, including the step of representing echo amplitude logarithmically on the amplitude axis.

3. A method according to claim 2, wherein each threshold curve segment generated represents a constant amplitude on the amplitude axis.

4. A method according to claim 1, wherein the threshold curve segments are connected by segments representing a default amplitude greater than that of any point on the profile to be processed.

5. A method according to claims 1, wherein the echo amplitude profile is generated by an acoustic pulse-echo ranging system.

6. A method according to claim 1, wherein the echo amplitude profile is generated by a microwave pulse-echo ranging system.

7. A method for processing an echo amplitude profile, generated by an echo ranging system with reference to a temporal axis, to identify return echoes comprised by the profile by identifying amplitude peaks in the profile, with respect to an amplitude axis, above a threshold curve on the same temporal axis, the threshold curve defining echo base lines delimiting areas beneath the amplitude peaks of the echo amplitude profile, including the step of identifying the position of at least one selected echo corresponding to a selected one of said peaks on the temporal axis by determining the temporal position of the centre of area of the area delimited beneath the selected peak.

8. A method according to claim 7, wherein the echo base line of at least the selected amplitude peak is shifted upwardly relative to the amplitude axis relative to a minimum amplitude level at which it can delimit an area beneath the peak so as to delimit an upper portion of the area beneath the amplitude peak, and the central area of that portion is determined to identify the temporal position of the echo.

* * * * *